July 9, 1929.  H. D. BINKS  1,720,389
AIR CONTROL VALVE FOR SPRAY GUNS
Filed Jan. 7, 1928  2 Sheets-Sheet 1
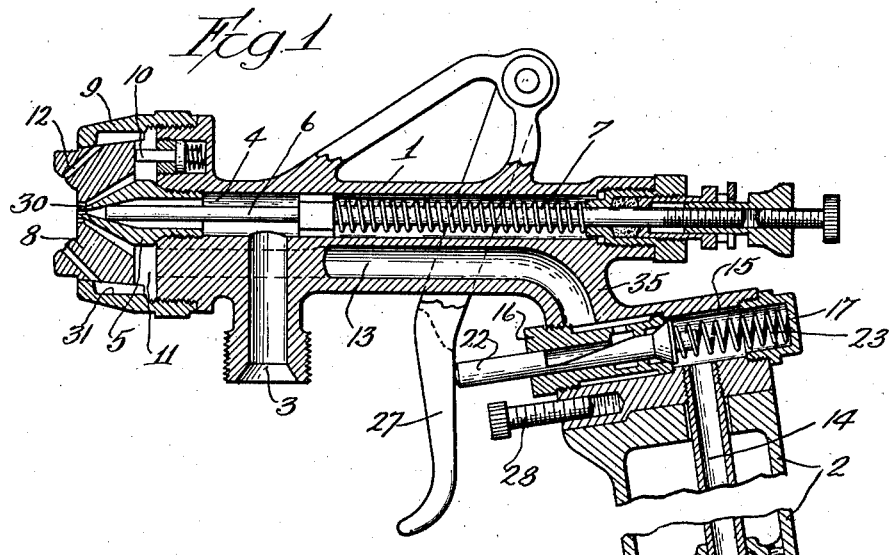
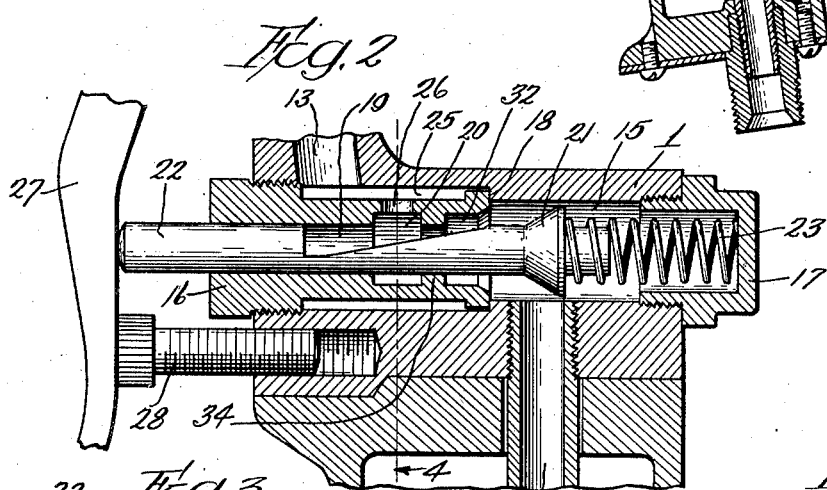
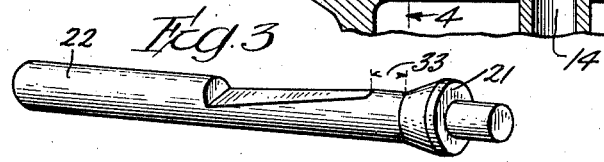
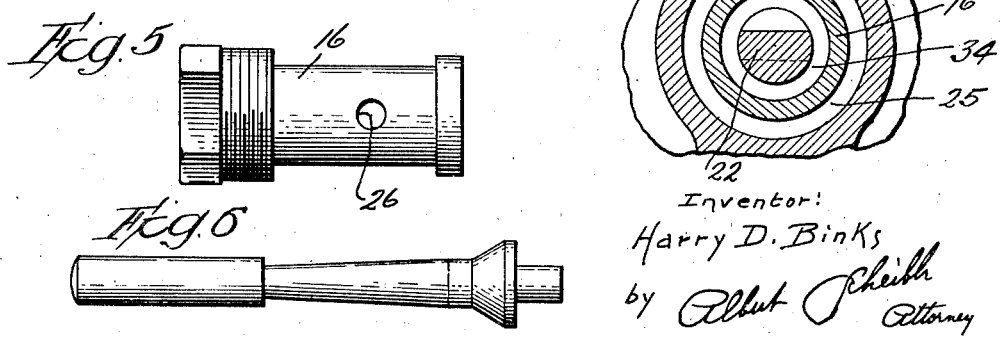
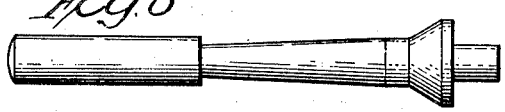
Inventor:
Harry D. Binks
by Albert Scheibl
Attorney July 9, 1929.   H. D. BINKS   1,720,389
AIR CONTROL VALVE FOR SPRAY GUNS
Filed Jan. 7, 1928   2 Sheets-Sheet 2
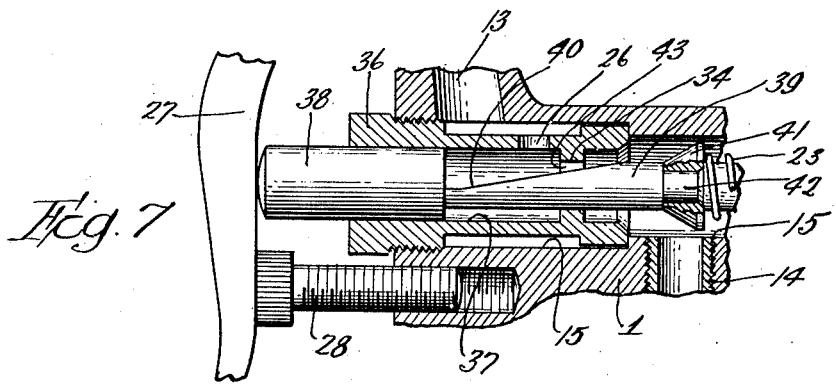
Fig. 7
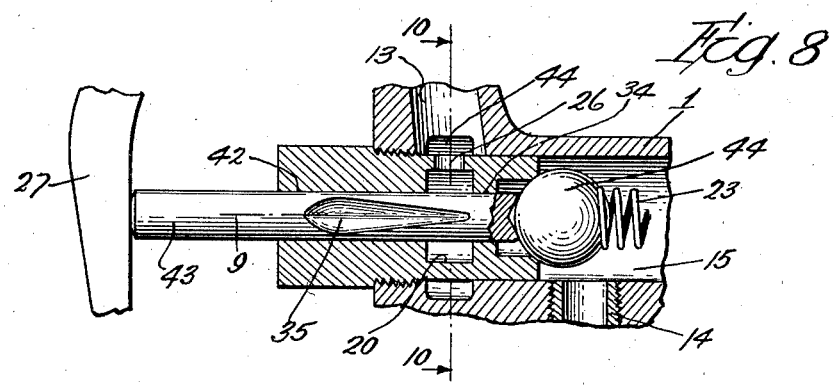
Fig. 8
Fig. 9
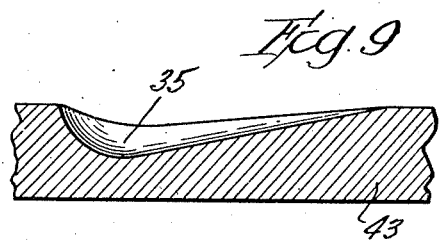
Fig. 10
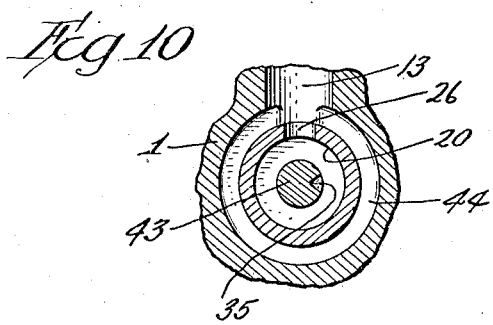
Inventor:
Harry D. Binks
by Albert Scheible
Attorney Patented July 9, 1929.

1,720,389

UNITED STATES PATENT OFFICE.

HARRY D. BINKS, OF OAK PARK, ILLINOIS, ASSIGNOR, BY MESNE ASSIGNMENTS, TO BINKS MANUFACTURING COMPANY, OF CHICAGO, ILLINOIS, A CORPORATION OF DELAWARE.

AIR-CONTROL VALVE FOR SPRAY GUNS.

Application filed January 7, 1928. Serial No. 245,070.

My invention relates to means for controlling the supply of compressed air or other motive fluid in spray appliances, as for example in so called spray guns. In this general type of spray devices, the liquid which is to be sprayed is commonly fed to the spray gun under pressure, and the projected stream of liquid is converted into spray by the action of compressed air. To secure the desired spread and diffusion of the spray, the supply of compressed air must be controlled in proportion to the characteristic qualities of the particular liquid which is being sprayed, and the efficiency of the appliance—measured both by the amount of surface which can be sprayed in a given time and by the uniformity of distribution of the particles of the spray—depends largely on the accuracy with which this air supply is controlled.

In one of its main objects, my present invention aims to provide an air control valve which will afford an unusually sensitive, easily effected and readily maintained adjustment. Furthermore, my invention provides a valve construction for this purpose which can readily be applied to standard types of spraying appliances, which will be inexpensive in manufacture, which will be durable, which can readily be disassembled for inspection and cleaning, which will not be disturbed in its adjustment by its reassembly, and which will minimize the throttling action of the valve in proportion to the given adjustment.

More particularly, my invenition provides an air control valve for such a spraying appliance, in which the amount of the admitted air increases very gradually in definite proportion to the movement of the movable valve member, in which this movable valve member will be easy to manufacture, and in which the control of the admitted air will not be affected by the rotational positions of this movable valve member or of the valve body. Moreover, my invention provides a construction for this purpose in which the outlet port of the valve body can be spaced longitudinally of this valve body from the entrance end of the air passage to which the air is supplied through the valve, without throttling the air supply.

Still further and also more detailed objects will appear from the following specification and from the accompanying drawings, which show my invention as applied to a spray gun having a spraying head which emits forwardly converging jets for flattening the emitted spray.

In the drawings,

Fig. 1 is a central, vertical and longitudinal section through such a spray gun, with both the liquid control valve and the air control valve in their closure positions.

Fig. 2 is an enlargement of the portion of Fig. 1 which includes the air control valve, with the trigger drawn back and halted by the adjustable stop screw to hold the movable air valve member in an intermediate adjusted position.

Fig. 3 is a perspective view of the movable valve member.

Fig. 4 is an enlarged section taken transversely of the valve along the line 4—4 of Fig. 2.

Fig. 5 is an enlarged plan view of the tubular valve body in which the movable valve member of Fig. 3 is slidably mounted.

Fig. 6 is an elevation of an alternative form of the movable valve member, namely one in which the movable air valve member has a frustro-conical portion.

Fig. 7 is a fragmentary section, similar to a portion of Fig. 2, showing another air control valve also embodying my invention.

Fig. 8 is a fragmentary section, also similar to a portion of Fig. 2, showing a still different air control valve embodying my invention.

Fig. 9 is an enlarged central section through a portion of the valve stem of Fig. 8, taken along the line 9—9 of that figure.

Fig. 10 is a section taken along the line 10—10 of that figure.

In the embodiment of Figs. 1 to 4, the spray gun has as a body comprising a barrel 1 supported by a handle 2. The barrel 1 has the usual inlet bore 3 leading to a liquid supply passage 4 through which the liquid passes through a liquid nozzle 5, the outlet of this nozzle being controlled by a needle valve 6 which is normally held in its closure position by a spring 7 disposed in the liquid supply passage. Freely surrounding the tip of the liquid nozzle 5, so as to leave a narrow annular air discharge outlet 30 around this tip, is an air nozzle 8. This air nozzle is restricted in forward movement and also kept concentric with the liquid nozzle by a retaining ring or collar 9 threaded on the forward end of the barrel, and the air nozzle 8 is pressed forwardly against this retaining ring by spring-pressed plungers 10. These plungers continually keep the rear end of the air nozzle spaced forwardly from the front end of the barrel, so as to afford an air storage chamber 11 behind and laterally around a considerable portion of the liquid nozzle 5.

The retaining ring is provided on its interior with longitudinal grooves 31 which connect this air storage chamber 11 with the rear ends of two ports 12, which ports extend through the air nozzle and converge forwardly toward a common point on the axis of the liquid nozzle forward of both the liquid and air nozzles. Opening at its forward end into the air storage chamber 11 is an air supply passage 13 which extends rearwardly and then downwardly through the barrel toward the top of the handle 2, and which receives its supply of air from an air inlet tube 14 mounted in the hollow handle 2. Extending through the body member adjacent to the juncture of the body to the handle, and connecting this air inlet tube 14 with the rear end of the air supply passage 13, is a bore 15 in which the tubular air valve body 16 is mounted, which bore 15 is closed at its rear end by a detachable cap 17.

The bore 15 is enlarged in diameter for a considerable portion of its length from its forward end so as to afford an annular stop shoulder 18 against which the rear end of the tubular valve body 16 abuts when a forward threaded portion of this valve body is screwed into the threaded forward end of the bore 15. This tubular valve body has an axial bore 19 which is of uniform diameter except for an enlarged bore portion 20 intermediate of its length, and for an enlarged rear end portion 32 which flares rearwardly at its extreme rear end. Seating in this flaring rear end is the forwardly tapering head 21 on a valve stem 22 which slidably fits the bore 19 of the tubular valve body 16 and which projects for a considerable distance forwardly beyond the valve body. The length of this valve body and the location of the stop shoulder 18 are such that the tapering rear end of the valve body is disposed forwardly of the upper end of the air inlet tube 14, so that the head 21 of the removable valve member (which consists of the stem 22 and the head 21) shuts off the supply of air to the bore of the tubular valve body when the said head is pressed against its said seat (as shown in Fig. 1) by a compression spring 23 interposed between the head 21 and the cap 17.

The valve body 16 is reduced in its external diameter intermediate its length so as to afford an annular air chamber 25 between it and the wall of the bore 15. This annular air chamber 25 is continuously connected to the rear end of the air supply passage 13, and this air chamber is connected to the radially enlarged bore portion 20 of the tubular valve member by a radial port 26. The stem 22 of the movable valve member is reduced in cross-section for a considerable portion of its length, as for example by milling out a portion at an acute angle to the axis of the stem, as shown in Fig. 3, the cut being made so that it gradually deepens forwardly of the stem from a stem portion which is behind the enlarged bore portion 20 of the tubular valve body when the head 21 of the movable valve member is in its closure position. This forwardly increasing reduction in the cross-section of the valve stem extends to a point considerably forward of the said bore enlargement 20 but terminates back of the forward end of the valve body, so as to leave a forward stem portion continually closing the forward end of the valve body. Moreover, this reduction in the transverse section of the valve stem also terminates somewhat forward of the head 21, so as to leave an unreduced stem portion 33 (Fig. 3) adjacent to the head, which portion is housed by the normal-diametered bore part 34 of the valve body when the head 21 is seated as in Fig. 1.

To slide the movable valve member rearwardly against the pressure of the spring 23, I provide the usual pivoted trigger 27 which bears against the forward end of the valve stem and which is operatively connected in any customary manner to the needle valve 6, and I also provide a stop screw 28 projecting forwardly from the handle 2 into the path of the trigger for limiting the rearward swinging of the trigger.

When the trigger is moved rearwardly from its inoperative position of Fig. 1, it slides the movable valve member rearwardly so that it first unseats the head 21 from the end of the tubular valve body, and so as to afford an opening between the unwidened bore of that body and the taperingly reduced part of the valve stem after the stem portion 33 has been slid rearwardly out of the bore portion 34 of the valve body. The cross-sectional area of this opening increases as the stem is moved rearwardly and the gradual tapering affords an exceedingly gradual change in the opening thus afforded for the admission of air to the enlarged bore portion 20, and from the latter through the port 26 and the annular air chamber 25 to the air supply passage 13 in the barrel. Consequently, I secure an extremely delicate adjustment of the air supply, and by screwing the stop screw 28 in or out, I can definitely limit the amount of the air supply to an accurately adjusted extent which is not altered by removing and cleaning the valve parts.

When the air valve is thus opened, the compressed air supplied through the air inlet tube to the rear portion of the gun body bore 15 passes through the rear end bore portion 32 and the bore of the portion 34 to the enlarged bore portion 20 of the valve body, and this enlarged bore portion affords an air chamber extending circumferentially around the part of the stem which is opposite the port 26. Consequently, it is immaterial whether the cut (or other sectional reduction) in the valve stem faces the port 26 or faces some other direction. Likewise the annular air chamber 25 continually connects the port 26 with the entrance end of the air passage 13 and this air chamber can be quite large in proportion to the port 26, so that the air supply is not affected by rotating the valve body so that the radial port 26 is turned in some other direction than that shown in Figs. 1 and 2. For these reasons, the valve stem can be freely rotatable in the valve body, and no great accuracy is required as to the length of the valve body, the latter being threadedly attached to the spray gun body until it is stopped by the shoulder 18 and without regard to the rotational position of the valve body when thus attached.

The valve stem can easily be turned in a lathe or screw machine for slidably fitting both the long major bore portion 19 of the valve body and the short bore of the portion 34, so that the cost of manufacturing my novel air control arrangement is quite low. Moreover, this entire mechanism can readily be removed, cleaned and replaced by merely unscrewing the valve body and the end cap 17. By reducing the external diameter of the medial portion of the valve body to afford the annular air chamber 25, I also permit the radial port 26 to be offset longitudinally of the valve body from the entrance to the air passage 13. In a spray gun type of appliance, this allows the neck 35 of the gun body to be quite small longitudinally of the barrel, thereby reducing the weight of the gun body and also providing more convenient access to the rear end of the barrel.

However, while I have heretofore described my invention in an embodiment which includes numerous desirable details of construction and arrangement, I do not wish to be limited to these, since many changes might be made without departing either from the spirit of my invention or from the appended claims. For example, the reduction in the cross-section of the longitudinally medial part of the valve stem might be made by turning that part to a forwardly tapering form, as shown in Fig. 6. Or, this reduction in cross-section may be afforded by cutting a forwardly deepening longitudinal groove in the stem, as shown for example by the V-sectioned groove 35 in Figs. 8, 9 and 10. Hence I do not wish to be limited to any particular stem construction for affording the forwardly tapering cross-section of the medial valve stem portion.

Neither do I wish to be limited to the particular valve head and seat arrangement of Fig. 2, nor to the providing of two equidiametered bore portions between an enlarged bore portion in the valve body, nor to the peripheral grooving of the valve body, nor to the providing of the valve stem with an integral head. Each of the just mentioned features may have an equivalent substituted for it to afford the same functioning, as shown for example in Figs. 7 to 10 inclusive.

In Fig. 7 the tubular valve body 36 has a main bore portion 37 which extends forwardly from the contracted bore portion 34 past the lateral port 26 to the forward end of the valve body. The valve stem has a cylindrical forward portion 38 which slidably fits the said main bore portion, and a smaller diametered stem portion 39 which has the sectional reduction 40 extending past the lateral port 26 and which also has a more rearward cylindrical portion adapted to fit the contracted bore portion 34 when the head 41 of the valve is seated on the rear end of the valve body. The head 41 in this case is separately formed to fit over a reduced rear end portion 42 of the stem of the slidable valve member, and this stem portion 42 is flared out at the rear end of the head. In this case, the part of the larger bore portion 37 between the rear end of the stem portion 38 and the bore contraction 34 affords a large air chamber connecting the effective inlet 43 (or space between the bore of the contraction and the sectionally reduced stem part within this contraction) to the lateral port. The outlet port 26 opens into an annular chamber 44 in the valve body, which chamber intercepts the air passage 13 so as to afford a connection from the outlet port 26 to this air passage regardless of the rotational position of the said port.

In Fig. 8, the forward bore portion 42 is of the same diameter as the bore of the contraction 34 and the valve stem 43 is of a uniform diameter except for the forwardly increasing reduction in its section which in this case is afforded by a forwardly deepening and widening V-sectioned groove 35 in one side of the stem. A bore enlargement 20 connects this groove 35 with the lateral port 26, and this port opens directly into the air passage 13, so that no peripheral groove in the valve body is required. Fig. 8 also shows a spherical valve head constructed separately from the valve stem 43 and continually pressed against the concaved rear end of this stem by the valve retracting spring 23.

With each of the three embodiments (namely, those of Fig. 2, Fig. 7 and Fig. 8) it will be evident that the rearward movement of the valve stem first unseats the valve head to admit air behind the bore contraction and then admits air past this contraction in a quantity increasing with the extent to which the valve stem is moved rearwardly. It will also be evident that in each of these three cases the air thus admitted forwardly past the bore contraction can pass readily to the lateral port 26 regardless of the rotational position of the valve stem. And, since the transverse areas of the bore enlargement 20 in Figs. 2 and 8, and of the annular air space 25 opposite the lateral port 26 in the same figures are both much greater than the transverse area of the air passage opened in the bore contraction 34 by the rearward sliding of the stem, the air thus passing through the valve body to the lateral port 26 can expand correspondingly within this body before it reaches that port. Consequently, my valve is in one sense a reducing valve which reduces the pressure of the air supply for the spray gun head in a proportion decreasing with the amount of air supplied to the head through the valve.

While Fig. 1 shows the general construction of a spray gun including one embodiment of my invention, while Figs. 7 and 8 show fragmentary portions of spray guns including two other embodiments, neither the ease of attachment, nor the functioning of my novel air control valve is not dependent on the construction of the remainder of the appliance of which such a valve forms a part. Such valves could obviously be adapted by any mechanic to other types of spraying appliances, and in each case some provision corresponding in effect to the stop screw 28 could easily be employed for limiting the quantity and pressure of the air supplied to the bore of the control valve. By including such a limit provision in each case, the user can readily maintain the desired air supply with a high degree of accuracy, since the limiting stop means only need to be adjusted initially.

I claim as my invention:

1. Means for controlling the supply of air in a spraying appliance, comprising a tubular valve body having a lateral port and a bore contraction behind the port, and a movable valve stem having a portion slidably fitting the said bore contraction and housed by the said contraction when the valve is closed; the portion of the said stem forward of the aforesaid portion, and which extends through the said contraction when the valve is opened by rearward movement of the stem, being reduced in cross-section to an extent gradually increasing forwardly of the said stem.

2. Air control means as per claim 1, in which the reduction in the cross-section of the stem starts at the part of the said stem which is substantially at the forward end of the said bore contraction when the valve is closed, and in which the said section reduction extends along a stem portion considerably longer than the said bore contraction.

3. Air control means as per claim 1, in combination with means responsive to the movement of the stem for controlling the admission of air to the bore of the valve body behind the said bore contraction.

4. Air control means as per claim 1, in which the portion of the stem which is forward of the lateral port slidably fits a valve body bore portion forward of the said bore contraction.

5. Means for controlling the supply of air in a spraying appliance, comprising a tubular valve body having a lateral port and a bore contraction behind the port, and a movable valve stem having a portion slidably fitting the said bore contraction and housed by the said contraction when the valve is closed, the stem having a portion forward of the aforesaid stem portion extending across the said lateral port and reduced in cross-section to an extent gradually increasing forwardly of the said stem; and a head adapted to be moved rearwardly by the said stem and controlling the admission of air to the valve body.

6. Means for controlling the supply of air in a spraying appliance, comprising a tubular valve body having a lateral port and a bore contraction behind the port, and a movable stem having a portion slidably fitting the said bore contraction and housed by the said bore contraction when the valve is closed, the portion of the said stem forward and adjacent to the aforesaid portion being reduced in cross-section to an extent gradually increasing forwardly of the said stem; and an appliance body having a bore housing the rear part of the valve body and the part of the valve body through which the said port extends, the appliance body having an air passage disposed with its inlet adjacent to the said port, and having an air inlet connected to the bore of the valve body behind the said contraction.

7. Air control means as per claim 6, in which the portions of the said bodies adjacent to the said port are formed to afford an annular air chamber surrounding the valve body and opening to the said air passage.

8. Air control means as per claim 6, in which the said bore in the appliance body has a cylindrical part housing the said parts of the valve body, the valve body having portions forward and rearward of the said port fitting the said bore and having an intermediate portion of smaller external diameter extending across the said port and the said air passage inlet.

9. Means for controlling the supply of air in a spraying appliance, comprising a tubular valve body having a lateral outlet port leading to its bore forward of a contracted bore portion, and a valve stem slidably in the bore of the valve body and having a stem portion slidably fitting both the contracted bore portion and a bore portion forward of the said port, the stem having a portion thereof reduced in cross-section to an extent gradually increasing forwardly of the stem, the said reduced stem portion having its rear end normally forward of the rear end of the contracted bore portion and its forward end behind the forward end of the valve body.

10. Means for controlling the supply of air through a bore in a body member which bore connects an air inlet passage and an air supply passage disposed in the body member and spaced longitudinally of the said bore; comprising a tubular valve body rigidly mounted in the forward part of the said bore and extending across the inlet of the air supply passage and disposed forward of the outlet of the air inlet passage, the valve body having a lateral port connecting its bore to the said air supply passage; a movable valve member comprising a stem slidable in the tubular valve body and having a head adapted to seat on the rear end of the valve body, the said stem having a relatively long portion extending across the said port and reduced in cross-section to a forwardly increasing extent, the valve body having between its rear end and the said port a contracted bore portion normally closely housing a part of valve stem which is not reduced in cross-section.

11. In a spraying appliance a body having a bore therein and an air supply passage leading laterally from the said bore, and having an air inlet connected to the rear end of the bore; a tubular valve body extending into the bore from the forward end thereof, and having a lateral port leading from its bore, and connected to the air supply passage, the part of the valve body through which the lateral port extends being of larger diameter than the bore portion behind this port; and a valve stem slidable in the bore of the valve body and having portions respectively fitting bore parts disposed forward and rearward of the said larger diametered bore portion, a part of the stem between these portions being reduced in cross-section to a forwardly increasing extent.

12. A device as per claim 11, including a spring continually urging the stem forwardly, fixed means for limiting the forward movement of the stem by the spring, and adjustable means for operatively limiting the rearward movement of the stem.

Signed at Chicago, Illinois, December 29th, 1927.

HARRY D. BINKS.